United States Patent
Bao

(10) Patent No.: US 12,474,956 B2
(45) Date of Patent: Nov. 18, 2025

(54) APPLICATION PROGRAM CONTROL METHOD AND APPARATUS, AND ELECTRONIC DEVICE

(71) Applicant: VIVO MOBILE COMMUNICATION CO., LTD., Dongguan (CN)

(72) Inventor: Bingbing Bao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 469 days.

(21) Appl. No.: 18/146,692

(22) Filed: Dec. 27, 2022

(65) Prior Publication Data

US 2023/0153154 A1    May 18, 2023

Related U.S. Application Data

(63) Continuation of application No. PCT/CN2021/102044, filed on Jun. 24, 2021.

(30) Foreign Application Priority Data

Jun. 29, 2020 (CN) .......................... 202010609503.4

(51) Int. Cl.
*G06F 9/48* (2006.01)
*G06F 9/451* (2018.01)

(52) U.S. Cl.
CPC ............ *G06F 9/4881* (2013.01); *G06F 9/451* (2018.02)

(58) Field of Classification Search
None
See application file for complete search history.

(56) References Cited

U.S. PATENT DOCUMENTS

2009/0172594 A1    7/2009    Chen
2016/0224207 A1    8/2016    Wu et al.

FOREIGN PATENT DOCUMENTS

| CN | 104199646 A | * | 12/2014 | |
|---|---|---|---|---|
| CN | 105468426 A | * | 4/2016 | ........... G06F 9/5022 |
| CN | 105975162 A | | 9/2016 | |
| CN | 105975347 A | | 9/2016 | |
| CN | 106055210 A | * | 10/2016 | .......... H04M 1/0202 |
| CN | 106095482 A | | 11/2016 | |
| CN | 106200866 A | | 12/2016 | |
| CN | 106201464 A | * | 12/2016 | ............. G06F 9/451 |

(Continued)

OTHER PUBLICATIONS

European Patent Office, Supplementary European Search Report issued in corresponding Application No. EP 21832456 dated Nov. 9, 2023.

(Continued)

*Primary Examiner* — Charles E Anya
(74) *Attorney, Agent, or Firm* — Stites & Harbison, PLLC; Jeffrey A. Haeberlin

(57) ABSTRACT

An application program control method and apparatus, and an electronic device. The method includes: in a case that a preset program running stop condition is satisfied, stopping the running of a target application program (101); and displaying a first preset identifier at a first preset position of a target program icon, where the target program icon is an icon corresponding to the target application program, and the first preset identifier is used for indicating that the target application program is in a running stopped state (102).

19 Claims, 7 Drawing Sheets

(56) References Cited

FOREIGN PATENT DOCUMENTS

| | | | | | |
|---|---|---|---|---|---|
| CN | 106227569 | A | | 12/2016 | |
| CN | 106292997 | A | | 1/2017 | |
| CN | 106354613 | A | | 1/2017 | |
| CN | 106383571 | A | | 2/2017 | |
| CN | 106528284 | A | * | 3/2017 | ............. G06F 9/485 |
| CN | 106573548 | A | * | 6/2017 | ......... G06F 3/04817 |
| CN | 106873848 | A | * | 6/2017 | |
| CN | 106933725 | A | | 7/2017 | |
| CN | 107329749 | A | * | 11/2017 | ......... G06F 3/04817 |
| CN | 107436805 | A | * | 12/2017 | ........... G06F 9/5022 |
| CN | 107765948 | A | | 3/2018 | |
| CN | 107943549 | A | * | 4/2018 | ......... G06F 3/04817 |
| JP | 2013114435 | A | | 6/2013 | |
| JP | 2016-530614 | A | | 9/2016 | |
| WO | 2018/018706 | A1 | | 2/2018 | |

OTHER PUBLICATIONS

Japan Patent Office, Office Action issued in corresponding Application No. JP 2022-580395, dated Mar. 5, 2024 (translation not available).

Korean Intellectual Property Office, Office Action (Request for the Submission of an Opinion) issued in corresponding Application No. 10-2023-7002808 mailed Nov. 12, 2024.

China National Intellectual Property Administration, International Search Report issued in corresponding Application No. PCT/CN2021/102044, mailed Sep. 24, 2021.

\* cited by examiner

APPLICATION PROGRAM CONTROL METHOD AND APPARATUS, AND ELECTRONIC DEVICE

CROSS-REFERENCE TO RELATED APPLICATIONS

This application is a continuation of International Application No. PCT/CN2021/102044, filed on Jun. 24, 2021, which claims priority to Chinese Patent Application No. 202010609503.4 filed in China on Jun. 29, 2020, which are incorporated herein by reference in their entireties.

TECHNICAL FIELD

This application to the technical field of communications, and in particular, to an application program control method and apparatus, and an electronic device.

BACKGROUND

With the popularization of electronic devices, more functions are integrated in electronic devices, while the design of the electronic devices is also getting more complex. The stacking and combination of components having high power consumption such as screens and antennas in electronic devices cause the standby time of electronic devices to be shorter and shorter. In the prior art, it is common that a large amount of power of an electronic device is unconsciously consumed during a user using the electronic device before the electronic device automatically shuts down because of low battery, and consequently the user cannot use some application programs on the electronic device, which seriously affects normal work and life of the user.

SUMMARY

According to a first aspect of this application, an application program control method is provided, where the method includes:
  in a case that a preset program running stop condition is satisfied, stopping the running of a target application program; and
  displaying a first preset identifier at a first preset position of a target program icon, where the target program icon is an icon corresponding to the target application program, and
  the first preset identifier is used for indicating that the target application program is in a running stopped state.

According to a second aspect of this application, an application program control apparatus is provided, where the apparatus includes:
  a first running module, configured to, in a case that a preset program running stop condition is satisfied, stop the running of a target application program; and
  a first display module, configured to display a first preset identifier at a first preset position of a target program icon, where the target program icon is an icon corresponding to the target application program, and
  the first preset identifier is used for indicating that the target application program is in a running stopped state.

According to a third aspect of this application, an electronic device is provided. The electronic device includes a processor, a memory, and a program or an instruction stored on the memory and capable of running on the processor, where the program or instruction, when executed by the processor, implements steps of the application program control method according to the first aspect.

According to a fourth aspect of this application, a readable storage medium is provided. The readable storage medium stores a program or an instruction, where the program or instruction, when executed by a processor, implements steps of the application program control method according to the first aspect.

According to a fifth aspect of this application, a chip is provided. The chip includes a processor and a communication interface, where the communication interface is coupled to the processor, and the processor is configured to run a program or an instruction to implement the method according to the first aspect.

DETAILED DESCRIPTION

The technical solutions in the embodiments of this application are clearly described below with reference to the accompanying drawings in the embodiments of this application. Apparently, the described embodiments are merely some of the embodiments of this application, but not all the embodiments. Based on the embodiments of this application, all other embodiments obtained by a person of ordinary skill in the art without involving an inventive effort shall fall within the scope of protection of this application.

Terms "first", "second", etc. in the description and claims of this application are used for distinguishing similar objects, rather than describing specific sequences or orders. It should be understood that data so used may be exchanged in appropriate circumstances so that the embodiments of this application may be practiced in sequences other than those illustrated or described herein. Moreover, the objects distinguished by "first", "second", etc. are usually of the same type, and the number of objects is not limited. For example, there may be one or more of first objects. In addition, in the description and claims, the expression "and/or" represents at least one of the preceding and latter joined objects, and the character "/" generally represents the preceding and latter associated objects are in an "or" relation.

The application program control method provided in the embodiments of this application is described in detail below by specific embodiments and application scenarios with reference to the accompanying drawing.

Figure 1:
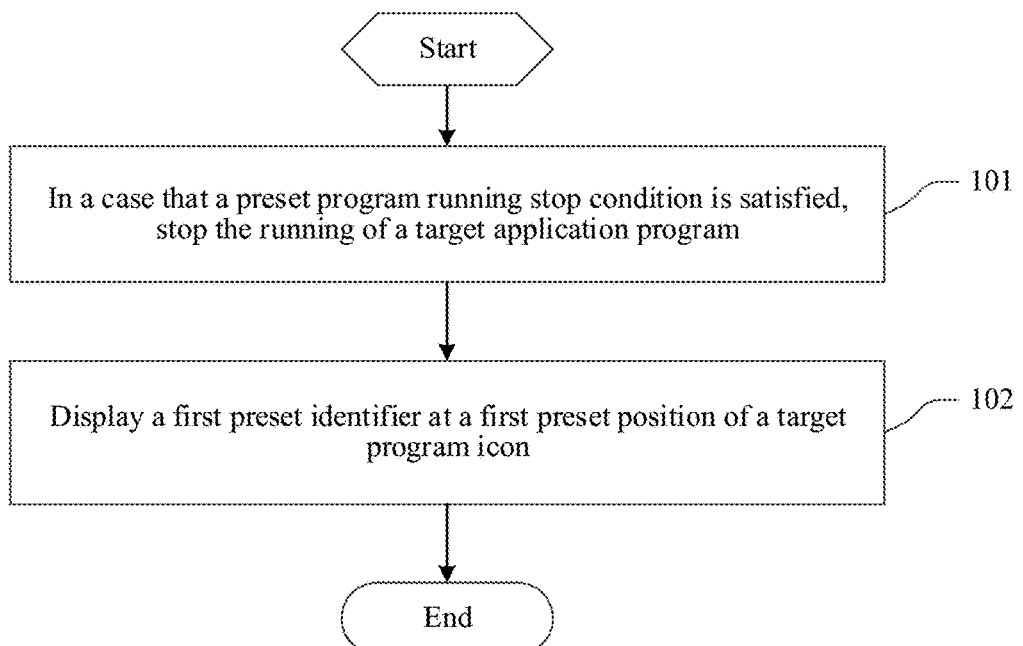
FIG. 1 is a flowchart of an application program control method provided in the embodiments of this application.

Referring to FIG. 1, FIG. 1 is a flowchart of an application program control method provided in the embodiments of this application, which includes the following steps as shown in FIG. 1.

Step 101. In a case that a preset program running stop condition is satisfied, stop the running of a target application program.

The program running stop condition may be that an input performed by a user for confirming stopping of the running of the target application program is received, or may be that the total power of an electronic device is less than a first preset value, or may be that the total power of an electronic device is less than a first preset value and an input performed by a user for confirming stopping of running of the target application program is received, or may be that an electronic device satisfies other conditions for stopping the running of the target application program, or the like. No limitation is made thereto in the embodiments of this application.

In addition, the target application program may include at least one application program. A plurality of application programs may be installed on the electronic device, and the plurality of application programs may include an application program that supports running some subtasks and an application program that only supports running all subtasks. The target application program may include one or more application programs among the plurality of application programs installed on the electronic device. The target application program may be a preset application program, or may be an application program selected by the user from among the plurality of application programs.

Step 102. Display a first preset identifier at a first preset position of a target program icon, where the target program icon is an icon corresponding to the target application program, and the first preset identifier is used for indicating that the target application program is in a running stopped state.

In addition, the first preset identifier may be a label, an icon, a picture, etc. Exemplarily, the first preset identifier may be an icon of any shape, such as a square icon, a circular icon, and a translucent icon. No limitation is made to the first preset identifier in the embodiments of this application. The first preset position may be a center position, an upper left corner, an upper right corner, etc. The displaying a first preset identifier at a first preset position of a target program icon may be superimposing the first preset identifier at the first preset position of the target program icon, for example, may be displaying the first preset identifier at the center position of the target program icon, or may be displaying the first preset identifier at the upper right corner of the target program icon, or may be completely covering the target program icon using the first preset identifier, or the like. No limitation is made thereto in the embodiments of this application.

Further, the first preset identifier is used for indicating that the target application program is currently in a running stopped state and remains in the running stopped state. In a case that the display of the first preset identifier is not canceled, the target application program cannot be started and run.

In addition, the running of the target application program may be stopped first, and the first preset identifier may then be displayed. Alternatively, the first preset identifier may be displayed first, and the running of the target application program may then be stopped. Alternatively, the first preset identifier may be displayed while the running of the target application program is stopped. No limitation is made thereto in the embodiments of this application.

It should be noted that, after the electronic device enters a power saving mode, the target application program in the running stopped state may be determined according to the first preset identifier. When the preset program running stop condition is satisfied, application programs other than the target application program may remain in a running state. The application programs other than the target application program may include application programs that realize basic functions of the electronic device, which, for example, may include text message, phone call, alarm clock, contacts, etc.

Figure 2:
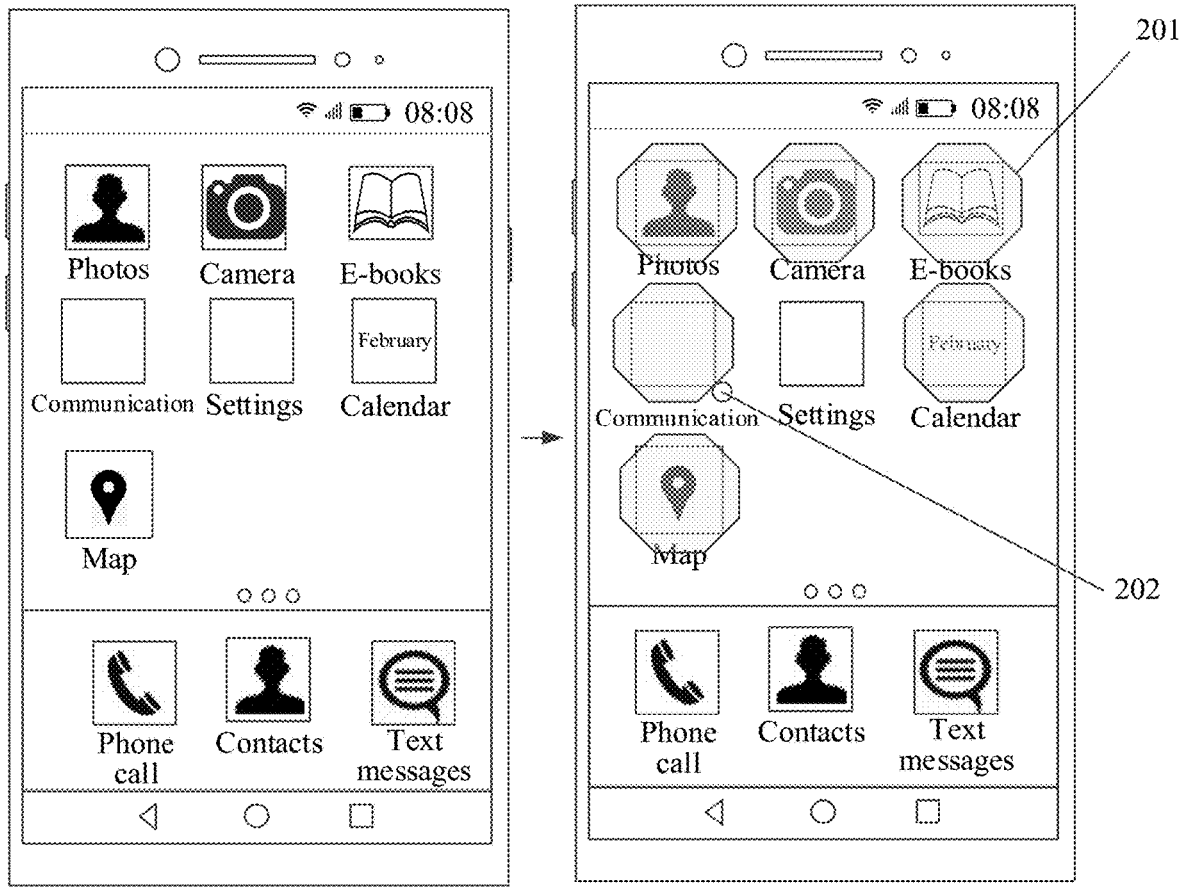
FIG. 2 is a first schematic diagram of interface display of an electronic device provided in the embodiments of this application.

In a practical application, for example, the electronic device is a mobile phone, and as shown in FIG. 2, the first preset identifier may be a freeze mask 201. The freeze mask 201 may be an icon having a freeze effect. After setting the use state of the mobile phone to the power saving mode, the application programs that realize the basic functions of the mobile phone, such as the contacts, text message, phone call, and settings of the mobile phone, may be kept running, and the running of other application programs such as installed third-party application programs may be stopped. The freeze mask 201 may be displayed at positions of the icons corresponding to the other application programs such as photos, camera, e-books, contacts, calendar, and map to freeze application programs. The freeze mask 201 is used for prompting the user that the applications are in a frozen state. To freeze may refer to stop running. If an application program is in a frozen state, it may mean that the application program is in a running stopped state, and the application program cannot be started before being unfrozen. To unfreeze, i.e., to release a frozen state, may refer to resume running and unfreeze an application program, and may mean to resume the running of the application program.

In the embodiments of this application, by stopping the running of the target application program, the remaining power of the electronic device may be fully and reasonably utilized, and the basic use of the electronic device by the user may be prevented from being affected to the greatest extent. The embodiments of this application can realize that the electronic device can more precisely control the running of application programs of the electronic device in the case of low power, thereby keeping the basic functions of the electronic device available and utilizing the remaining battery power efficiently and reasonably. Exemplarily, the electronic device is a mobile phone, the target application program may include application programs other than payment application programs. With the popularization of smartphones and online payment, the era of no banknotes has arrived. If users cannot use the payment function of mobile phones in the power saving mode, the basic necessities of the users will be seriously affected. In the scenarios of users using smartphones, stopping the running of the target application program can maximize the time for meeting the users' basic needs for mobile phones.

In the embodiments of this application, in a case that a preset program running stop condition is satisfied, the running of a target application program is stopped; and a first preset identifier is displayed at a first preset position of a target program icon, where the target program icon is an icon corresponding to the target application program, and the first preset identifier is used for indicating that the target application program is in a running stopped state. In this way, an electronic device can stop the running of the target application program in a case that the power is low and there is no charging device so as to facilitate precise control of the power of the electronic device and prevent shut down of the electronic device, thereby increasing the convenience of using the electronic device; and by displaying the first preset identifier on an icon, a user is prompted by intuitive display that the application program corresponding to the icon has stopped running, such that the user can quickly obtain state information of the application program.

Optionally, the displaying a first preset identifier at a first preset position of a target program icon includes:

in a case that the target application program supports running some subtasks, displaying the first preset identifier at the first preset position of the target program icon, and displaying a second preset identifier at a second preset position of the target program icon, where the second preset identifier is used for indicating that the target application program supports running some subtasks.

In addition, the second preset identifier may be a label, an icon, a picture, etc. Exemplarily, the second preset identifier may be an icon of any shape, such as a square icon, a circular icon, and a translucent icon. No limitation is made to the second preset identifier in the embodiments of this application. The second preset position may be a center position, an upper left corner, an upper right corner, etc. The displaying a second preset identifier at a second preset position of the target program icon may be superimposing the second preset identifier at the second preset position of the target program icon, for example, may be displaying the second preset identifier at the center position of the target program icon, or may be displaying the second preset identifier at the upper right corner of the target program icon, or may be completely covering the target program icon using the second preset identifier, or the like. No limitation is made thereto in the embodiments of this application.

In addition, the second preset identifier may be used as an entry for controlling subtasks of the target application program to stop running or resume running. In a case that the target application program supports running some subtasks, if an input for the second preset identifier is received, task information of at least one subtask of the target application program is displayed; a third input for task information of a target subtask among the at least one subtask is received; and the running of the target subtask is resumed in response to the third input.

In a practical application, as shown in FIG. 2, the first preset identifier may be a freeze mask 201, and the second preset identifier may be an energy saving identifier 202. For an application program that supports running some subtasks, the freeze mask 201 and the energy saving identifier 202 may be displayed; and for an application program that only supports running all subtasks, only the freeze mask 201 may be displayed. For example, for a communication application program which is an application program that supports running some subtasks, the freeze mask 201 and the energy saving identifier 202 are displayed, and for the photo, camera, e-book, calendar, and map application programs which are application programs that only support running all subtasks, only the freeze mask 201 is displayed.

In this implementation, for the target application program that supports running some subtasks, both the first preset identifier and the second preset identifier are displayed to allow users to distinguish between application programs that support running some subtasks and application programs that only support running all subtasks.

Optionally, after the stopping the running of a target application program, the method further includes:

receiving a first input performed by a user for the target application program; and in response to the first input, resuming the running of the target application program, where the first input includes at least one of the following: an input for the target program icon, an input for the first preset identifier displayed at the first preset position of the target program icon, and an input for the second preset identifier displayed at the second preset position of the target program icon.

The first input performed by the user for the target application program includes a first input performed by the user for the target application program through a finger or a touch device such as a stylus. The first input may be a tap input, a double tap input, an input by sliding with a preset gesture, etc. For example, the first input is an input for the target program icon. The first input may be an input by tapping the target program icon once, or may be an input by tapping the target program icon twice, or may be an input by sliding with a preset gesture on the target program icon. No limitation is made thereto in the embodiments of this application.

In this implementation, the first input performed by the user for the target application program is received; and the running of the target application program is resumed in response to the first input. In this way, the running of the target application program can be resumed by the input for the target program icon, the first preset identifier, or the second preset identifier, without needing to enter system settings of the electronic device to operate a plurality of menus to resume the running of the target application program, such that the running of the target application program can be quickly resumed.

Optionally, the resuming the running of the target application program includes:

in a case that the target application program only supports running all subtasks, displaying first prompt information, where the first prompt information is used for confirming whether to resume the running the target application program; and in a case of receiving a second input performed by the user for the first prompt information, resuming the running of the target application program.

The first prompt information may be pop-up prompt information, or may be interface prompt information, or the like. No limitation is made thereto in the embodiments of this application. The second input may be a tap input, a double tap input, an input by sliding with a preset gesture, etc. performed on the first prompt information to confirm resumption of the running of the target application program, for example, may be an input by tapping a control displaying "Confirm" to confirm resumption of the running of the target application program.

Figure 3:
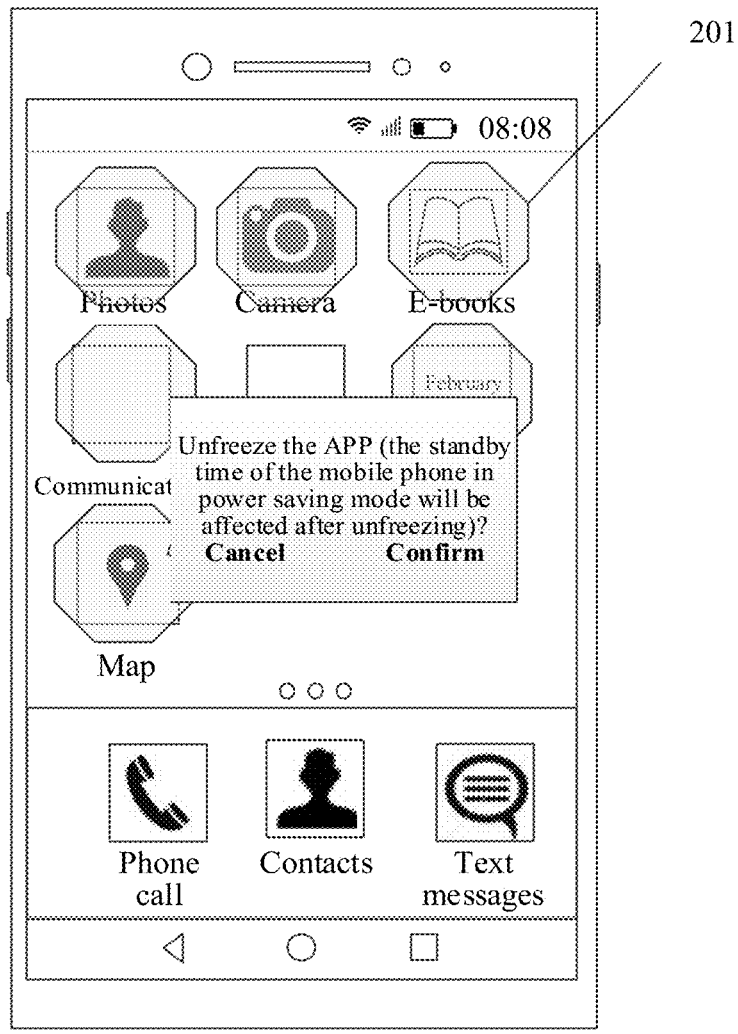
FIG. 3 is a second schematic diagram of interface display of an electronic device provided in the embodiments of this application.

In a practical application, the first prompt information may be pop-up prompt information. For example, the electronic device is a mobile phone, and as shown in FIG. 3, when a user taps the icon corresponding to an application program in a frozen state, the user is prompted in a pop-up manner that "Unfreeze the APP (Application Program) (the standby time of the mobile phone in power saving mode will be affected after unfreezing)?" If the user taps "Confirm", the application program can be unfrozen, the user can use the application program normally, and the freeze mask is no longer displayed on the icon; and if the user taps "Cancel", the pop-up prompt can be closed, and the application program remains frozen. If an application program is in a frozen state, the application program is in a running stopped state, and the application program cannot be started before being unfrozen. To unfreeze the application program is to release the frozen state of the application program to cause the application program to be in a resumed running state.

In this implementation, if an input for confirming resumption of the running of the target application program is received, the running of the target application program is resumed, such that the power of the electronic device can be managed according to the needs of the user, rather than forcibly restricting the power usage of the electronic device, thereby achieving precise control of the power of the electronic device.

Optionally, the resuming the running of the target application program includes:
  in a case that the target application program supports running some subtasks, displaying task information of at least one subtask of the target application program;
  receiving a third input for task information of a target subtask among the at least one subtask; and
  in response to the third input, resuming the running of the target subtask.

The target subtask may be one or more subtasks. The third input may be an input by taping the task information of the target subtask, or may be an input of selecting the task information of the target subtask, or the like. No limitation is made to the third input in the embodiments of this application.

In addition, the task information may include a task name, or may include a task priority, or may include a task type, or may include an estimated task power consumption, or the like. No limitation is made thereto in the embodiments of this application.

In a practical application, the electronic device is, for example, a mobile phone. A user taps the icon corresponding to an application program in a frozen state, and if the application program supports running some subtasks, a subtask selection box may pop up. Task information of a plurality of subtasks of the application program may be displayed in the subtask selection box, and the user may quickly set the subtasks that are allowed to run. For example, as shown in FIG. 4, when the user taps the icon of a communication application program, subtasks of the message communication service, update of a friend group list, and download of large files may be displayed, and the running of the subtasks may be stopped or resumed by taping selection controls corresponding to the respective subtasks.

In this implementation, since any subtask may be allowed to be unfrozen, fine control of power usage can be realized, and actual usage requirements of the user for the application program can be met.

Optionally, the task information includes at least a task name, and
  the task information further includes at least one of the following: task priority, task type, and estimated task power consumption.

Figure 4:
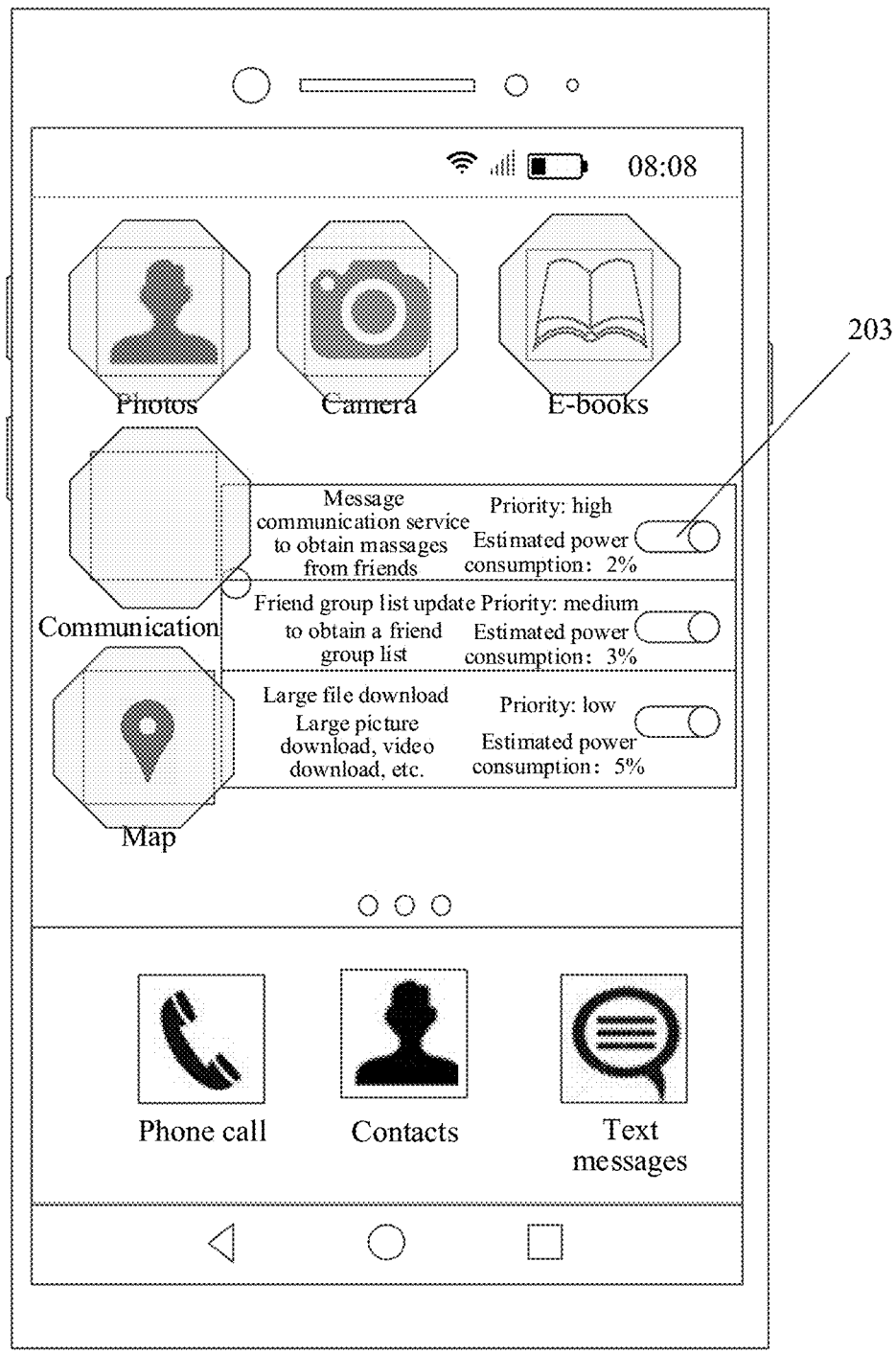
FIG. 4 is a third schematic diagram of interface display of an electronic device provided in the embodiments of this application.

As shown in FIG. 4, the task name may include the names of subtasks, which are displayed to the user, so that the user can distinguish between multiple subtasks. The task priority is used for indicating the importance of a subtask, and may include, for example, high, medium, and low priorities. The high priority may be used for indicating that the subtask implements a core function of an electronic device. The medium priority may be used for indicating that the subtask implements a non-core function, but affects user experience. The low priority may be used for indicating that the function implemented by the subtask is nonessential for the user. The task type may be used for representing task features of a subtask, and may include, for example, network requests, file downloads, background tasks, occupation of a lot of CPU resources, etc. The estimated task power consumption may be used for indicating the power consumed by a subtask. A user may determine, based on the estimated task power consumption by a subtask, whether to allow the subtask to run. The power consumed by each running subtask may be measured, and when the power consumed by a subtask is higher than a preset value, the running of the subtask may be stopped.

In addition, an application programming interface (Application Programming Interface, API) may be added to the electronic device to allow the electronic device to identify each subtask of the application program. If a particular subtask of an application program is allowed to run, the subtask may be executed normally. If a particular subtask of an application program is not allowed to run, the execution of the subtask may be stopped. To facilitate determination by a user of whether to adjust the working state of subtasks of an application program on an electronic device, the task information may include the task name, task priority, task type, and estimated task power consumption.

In this implementation, the user may determine whether to adjust the working state of the subtasks of the application program according to the task information of the subtasks of the application program, so as to facilitate fine power control by the user.

Optionally, the task information is displayed in a preset floating window, the preset floating window further includes at least one task control, and the task control is used for controlling each of the subtasks to stop running or resume running,
  where each subtask corresponds to a task control.

The task control may be a control of any shape, such as a circular control, an oval control, a square control, etc. No limitation is made to the representation form of the task control in the embodiments of this application. The preset floating window may be a floating window displayed on a screen of the electronic device. Upon receiving a first input performed by a user for the target application program, the preset floating window may be displayed near the target program icon, for example, the preset floating window may be displayed at the lower right of the target program icon. As shown in FIG. 4, the task control 203 may be an oval control, and by taping the circular button of the task control 203, the running of a subtask may be stopped or resumed. Taking a communication application program as an example, the communication application includes a message communication service subtask, and the running of the message communication service subtask may be resumed by taping the task control corresponding to the message communication service subtask.

In this implementation, each of the subtasks is controlled by the task control to stop running or resume running, so that the user can quickly control the running state of the subtasks.

Optionally, after the resuming the running of the target subtask, the method further includes:
  canceling the display of the first preset identifier; and displaying a third preset identifier at a third preset position of the target program icon, where the third preset identifier is used for indicating the power consumed in real time by the target application program after the running of the target subtask is resumed.

Figure 5:
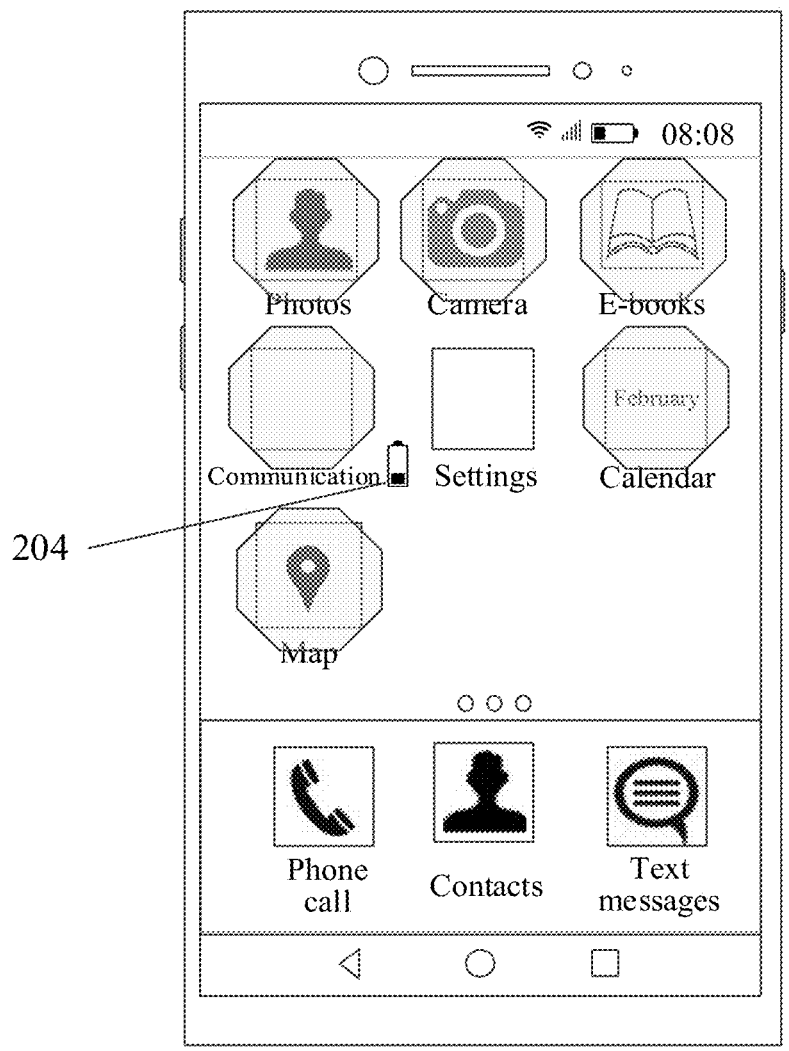
FIG. 5 is a fourth schematic diagram of interface display of an electronic device provided in the embodiments of this application.

The third preset position may be the center position, the upper left corner, the upper right corner, etc. The displaying a third preset identifier at a third preset position of the target program icon may be superimposing the third preset identifier at the third preset position of the target program icon, for example, may be displaying the third preset identifier at the center position of the target program icon, or may be displaying the third preset identifier at the upper right corner of the target program icon, or may be completely covering the target program icon using the third preset identifier, or the like. No limitation is made thereto in the embodiments of this application. The third preset identifier may be a label, an icon, a picture, etc. For example, the third preset identifier may be a label displaying a value, and the value may be the power consumed by the target application program. Alternatively, the third preset identifier may be an icon, and the icon may represent the power consumed by the target program icon. No limitation is made to the specific representation form of the third preset identifier in the embodiments of this application. The communication application program may be unfrozen immediately after the user selects to start a subtask. As shown in FIG. 5, a third preset identifier 204 may be displayed at the lower right corner of the icon corresponding to the communication application program. When the communication application program starts to consume power, the third preset identifier 204 may change from green to red and flashes continuously to prompt the user that the communication application program is consuming power.

In this implementation, by displaying the third preset identifier, the user can intuitively view the power consumed by the target application program, which facilitates management of the power of the electronic device by the user.

Optionally, after the canceling the display of the first preset identifier, the method further includes:

in a case that the power consumed by the target application program is higher than a first preset threshold, stopping the running of all subtasks of the target application program, and displaying the first preset identifier at the first preset position of the target program icon; and displaying second prompt information, where the second prompt information is used for giving a prompt that all subtasks of the target application program have stopped running.

Figure 6:
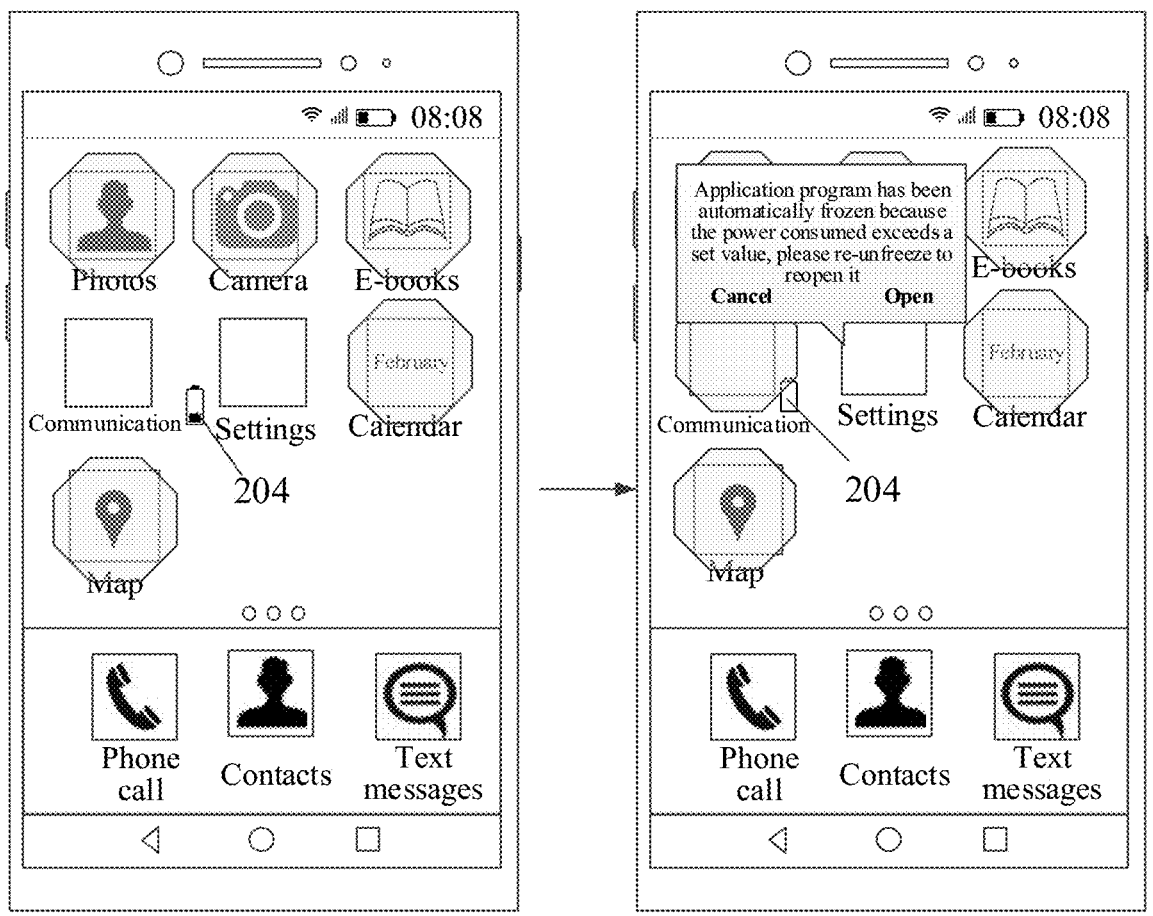
FIG. 6 is a fifth schematic diagram of interface display of an electronic device provided in the embodiments of this application.

The method further includes:

the second prompt information may be pop-up prompt information, or may be interface prompt information, etc. No limitation is made thereto in the embodiments of this application. In a practical application, for example, the electronic device is a mobile phone. As shown in FIG. 6, the target application program may be a communication application program. In the case that the power consumed by the target application program is higher than the first preset threshold, the running of all subtasks of the target application program may be stopped, a freeze mask may be displayed on the target program icon, the user may be prompted in a pop-up manner that "Application program has been automatically frozen because the power consumed exceeds a set value, please re-unfreeze to reopen it", and "Cancel" and "Open" controls may be provided to allow the user to confirm whether to re-unfreeze the target application program.

In this implementation, in the case that the power consumed by the target application program is higher than the first preset threshold, the running of all subtasks of the target application program is stopped, such that when the power consumption by the target application program is too high, the electronic device can automatically stop the running of the target application program, thereby preventing the power of the electronic device from being consumed too fast.

Optionally, after the stopping the running of the target application program, the method further includes:

in a case that the target application program supports running some subtasks and a preset first task running resumption condition is satisfied, resuming the running of a first subtask of the target application program; and in a case that a preset second task running resumption condition is satisfied, resuming the running of a second subtask of the target application program, where the target application program includes N subtasks, the N subtasks include the first subtask and the second subtask, and N is an integer greater than one.

The first subtask may include one or more subtasks. The second subtask may include one or more subtasks. The power consumed by the first subtask is less than the power consumed by the second subtask.

In addition, the first task running resumption condition may be that an input performed by a user for the first subtask is received, or may be that the total power of the electronic device is greater than a third preset threshold, or may be that the electronic device satisfies other conditions for resuming the running of the first subtask. The second task running resumption condition may be that an input performed by a user for the second subtask is received, or may be that the total power of the electronic device is greater than a fourth preset threshold, or may be that the electronic device satisfies other conditions for resuming the running of the second subtask, where the fourth preset threshold is greater than the third preset threshold.

Further, the condition value of the first task running resumption condition may be less than the condition value of the second task running resumption condition. If the electronic device satisfies the second task running resumption condition, the electronic device also satisfies the first task running resumption condition. However, when satisfying the first task running resumption condition, the electronic device does not necessarily satisfy the second task running resumption condition.

Exemplarily, in a case that the total power of the electronic device is greater than the third preset threshold, the running of the first subtask of the target application program is resumed, and in a case that the total power of the electronic device is greater than the fourth preset threshold, the running of the second subtask of the target application program is resumed. In this way, the target application program can be gradually unfrozen. For example, when the total power is 30%, the running of one subtask may be resumed; when the total power is 50%, the running of two subtasks may be resumed; and when the total power is 60%, the running of three subtasks may be resumed.

It should be noted that, whether the total power of the electronic device satisfies the first task running resumption condition or the second task running resumption condition may be determined by detecting the change of the total power of the electronic device in real time, so as to dynamically adjust the running state of an application program and control subtasks of the application program to resume running, thereby ensuring the normal use of some functions of the application program while saving power of the electronic device.

In this implementation, by determining whether the electronic device satisfies the first task running resumption condition or the second task running resumption condition, the running of subtasks of the target application program may be gradually resumed, so that precise management of the power of the electronic device can be achieved.

Optionally, after the resuming the running of a first subtask of the target application program, the method further includes:

updating the first preset identifier to a first display state, where the first display state indicates that the first subtask is in a resumed running state and all of the N subtasks other than the first subtask are in a running stopped state; and after the resuming the running of a second subtask of the target application program, the method further includes:

updating the first preset identifier to a second display state, where the second display state indicates that the first subtask and the second subtask are in a resumed running state and all of the N subtasks other than the first subtask and the second subtask are in a running stopped state.

The updating the display state of the first preset identifier may be updating the color, size, display shape, etc. of the first preset identifier. The first display state may differ from the second display state in respect of the display color, or display shape, display size, etc. For example, the first display state may be red, and the second display state may be blue. In a case that both the first subtask and the second subtask are in a resumed running state, the first preset identifier may be updated to a second display state.

In this implementation, the display state of the first preset identifier may be updated according to the number of subtasks of the target application program in the resumed running state. The display state of the first preset identifier varies with the change in the number of the subtasks in the resumed running state. Therefore, the user can intuitively obtain the resumption status of the subtasks of the target application program.

Optionally, after the stopping the running of a target application program, the method further includes:

in a case that an electronic device is connected to a charging device, resuming the running of the target application program, and canceling the display of the first preset identifier.

Figure 7:
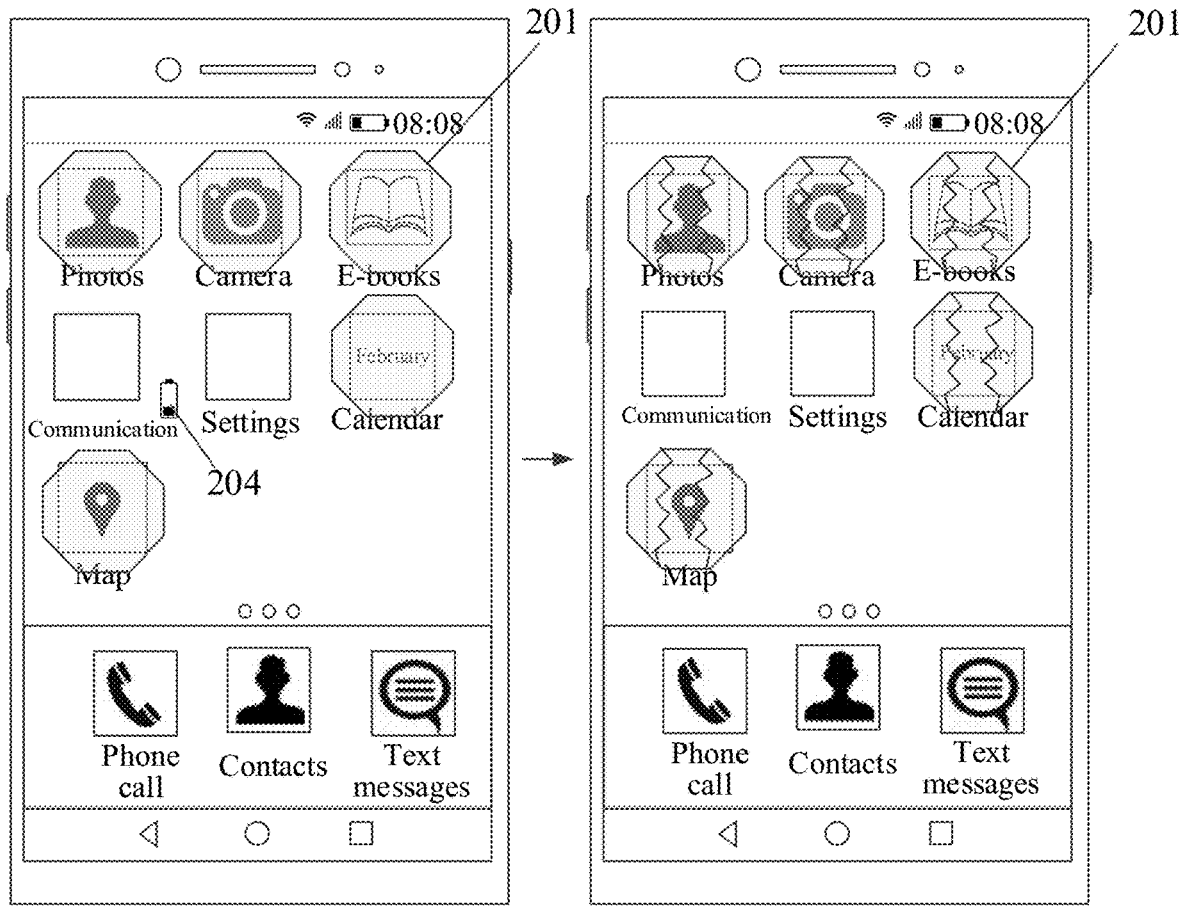
FIG. 7 is a sixth schematic diagram of interface display of an electronic device provided in the embodiments of this application.

After the electronic device enters a charging state, normal running of all application programs on the electronic device may be resumed. For example, the electronic device is a mobile phone. As shown in FIG. 7, when a user connects the mobile phone to a power supply, all application programs on the desktop automatically unfreeze to allow normal use, an effect of freeze cracking of the freeze mask 201 may be displayed, and the third preset identifier 204 at the lower right corner of an icon of a communication application program is automatically faded out and hidden.

In this implementation, when the electronic device is charging, the running of the target application program is resumed, and the target application program is unfrozen, so that in the charging state, all the application programs of the electronic device are in a running state, thus preventing affecting the user's normal use of application programs.

Optionally, the program running stop condition includes at least one of the following:

an input performed by a user for confirming stopping of the running the target application program is received, and the total power of the electronic device is less than a second preset threshold.

The receiving an input performed by a user or confirming stopping of the running of the target application program may be receiving an input performed by a user for setting the use state of the electronic device to a power saving mode to stop the running of the target application program, for example, may be receiving an input for setting the use state of the electronic device to the power saving mode by tapping in a setting interface a control representing the power saving mode, or for setting the use state of the electronic device to the power saving mode by using a shortcut key of the electronic device so as to stop the running the target application program; or may be receiving, in a case that the electronic device prompts whether to strop the running of the target application program, an input performed by a user for confirming stopping the running of the target application program; or the like. As a specific implementation, the program running stop condition may be that, in a case that the total power of the electronic device is less than the second preset threshold, a user operation for confirming the electronic device entering the power saving mode is received. For example, when the total power of the electronic device is less than the second preset threshold, a prompt box pops up to prompt whether to enter the power saving mode, and the program running stop condition may be that an input performed by a user for confirming entering the power saving mode is received.

In this implementation, in the case that a program running stop condition is satisfied, for example, the power is low or an input performed by a user for stop running the target application program is received, the running of the application program that meets the requirement is automatically stopped to prevent unknowingly consuming a large amount of power of the electronic device.

Optionally, the first task running resumption condition includes at least one of the following:

an input performed by a user for the first subtask is received, and the total power of the electronic device is greater than a third preset threshold; and the second task running resumption condition includes at least one of the following:

an input performed by a user for the second subtask is received, and the total power of the electronic device is greater than a fourth preset threshold, where the fourth preset threshold is greater than the third preset threshold.

The receiving the input performed by the user for the first subtask may be receiving an input performed by a user for selecting the first subtask in the preset floating window, or may be receiving an input performed by a user for tapping the task information of the first subtask in the preset floating window, or the like. The receiving the input performed by the user for the second subtask may be receiving an input performed by a user for selecting the second subtask in the preset floating window, or may be receiving an input performed by a user for tapping the task information of the second subtask in the preset floating window, or the like.

In this implementation, in the case that the task running resumption condition is satisfied, for example, the power is sufficient or an input performed by a user is received, the normal running of some subtasks of the application program that meets the requirement is automatically resumed, such that the normal use of important functions of the application program is ensured.

It should be noted that, in the application program control method provided in the embodiments of this application, an execution subject may be an application program control apparatus or a control module in the application program control apparatus for performing and loading the application program control method. In the embodiments of this application, the application program control apparatus provided by the embodiments of this application is described with an example in which the application program control method is performed and loaded by the application program control apparatus.

Figure 8:
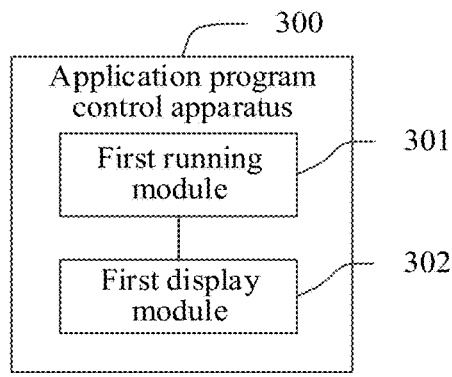
FIG. 8 is a schematic structural diagram of an application program control apparatus provided in the embodiments of this application.

With reference to FIG. 8, FIG. 8 is a schematic structural diagram of an application program control apparatus provided in the embodiments of this application. As shown in FIG. 8, the apparatus 300 includes:

a first running module 301, configured to, in a case that a preset program running stop condition is satisfied, stop the running of a target application program; and a first display module 302, configured to display a first preset identifier at a first preset position of a target program icon, where the target program icon is an icon corresponding to the target application program, and the first preset identifier is used for indicating that the target application program is in a running stopped state.

Optionally, the first display module 302 is further configured to:

in a case that the target application program supports running some subtasks, display the first preset identifier at the first preset position of the target program icon, and display a second preset identifier at a second preset position of the target program icon, where the second preset identifier is used for indicating that the target application program supports running some subtasks.

Optionally, the application program control apparatus 300 further includes:

a receiving module, configured to receive a first input performed by a user for the target application program; and a second running module, configured to, in response to the first input, resume the running of the target application program, where the first input includes at least one of the following: an input for the target program icon, an input for the first preset identifier displayed at the first preset position of the target program icon, and an input for the second preset identifier displayed at the second preset position of the target program icon.

Optionally, the second running module is further configured to:

in a case that the target application program only supports running all subtasks, display first prompt information, where the first prompt information is used for confirming whether to resume the running the target application program; and in a case of receiving a second input performed by the user for the first prompt information, resume the running of the target application program.

Optionally, the second running module is further configured to:

in a case that the target application program supports running some subtasks, display task information of at least one subtask of the target application program;

receive a third input for task information of a target subtask among the at least one subtask; and in response to the third input, resume the running of the target subtask.

Optionally, the task information includes at least a task name, and the task information further includes at least one of the following: task priority, task type, and estimated task power consumption.

Optionally, the task information is displayed in a preset floating window, the preset floating window further includes at least one task control, and the task control is used for controlling each of the subtasks to stop running or resume running, where each subtask corresponds to a task control.

Optionally, the application program control apparatus 300 further includes:

a second display module, configured to cancel the display of the first preset identifier; and a third display module, configured to display a third preset identifier at a third preset position of the target program icon, where the third preset identifier is used for indicating the power consumed in real time by the target application program after the running of the target application subtask is resumed.

Optionally, the application program control apparatus 300 further includes:

a third running module, configured to, in a case that the power consumed by the target application program is higher than a first preset threshold, stop the running of all subtasks of the target application program, and display the first preset identifier at the first preset position of the target program icon; and a fourth display module, configured to display second prompt information, where the second prompt information is used for giving a prompt that all subtasks of the target application program have stopped running.

Optionally, the application program control apparatus 300 further includes:

a fourth running module, configured to, in a case that the target application program supports running some subtasks and a preset first task running resumption condition is satisfied, resume the running of a first subtask of the target application program; and a fifth running module, configured to, in a case that a preset second task running resumption condition is satisfied, resume the running of a second subtask of the target application program, where the target application program includes N subtasks, the N subtasks include the first subtask and the second subtask, and N is an integer greater than one.

Optionally, the fourth running module is further configured to:

update the first preset identifier to a first display state, where the first display state indicates that the first subtask is in a resumed running state and all of the N subtasks other than the first subtask are in a running stopped state; and Optionally, the fifth running module is further configured to:

update the first preset identifier to a second display state, where the second display state indicates that the first subtask and the second subtask are in a resumed running state and all of the N subtasks other than the first subtask and the second subtask are in a running stopped state.

Optionally, the application program control apparatus 300 further includes:

a sixth running module, configured to, in a case that an electronic device is connected to a charging device, resume the running of the target application program, and canceling the display of the first preset identifier.

Optionally, the program running stop condition includes at least one of the following:

an input performed by a user for confirming stopping of the running the target application program is received, and the total power of the electronic device is less than a second preset threshold.

Optionally, the first task running resumption condition includes at least one of the following:

an input performed by a user for the first subtask is received, and the total power of the electronic device is greater than a third preset threshold; and the second task running resumption condition includes at least one of the following:

an input performed by a user for the second subtask is received, and the total power of the electronic device is greater than a fourth preset threshold, where the fourth preset threshold is greater than the third preset threshold.

In the embodiments of this application, in a case that a preset program running stop condition is satisfied, the first running module stops the running of the target application program; and the first display module displays the first preset identifier at the first preset position of the target program icon, where the target program icon is an icon corresponding to the target application program, and the first preset identifier is used for indicating that the target application program is in a running stopped state. In this way, an electronic device can stop the running of the target application program in a case that the power is low and there is no charging device so as to facilitate precise control of the power of the electronic device and prevent shut down of the electronic device, thereby increasing the convenience of using the electronic device; and by displaying the first preset identifier on an icon, a user is prompted by intuitive display that the application program corresponding to the icon has stopped running, such that the user can quickly obtain state information of the application program.

The application program control apparatus in the embodiments of this application may be an apparatus, or may be a component, an integrated circuit, or a chip in a terminal. The apparatus may be a mobile electronic device or a non-mobile electronic device. Exemplarily, the mobile electronic device may be a mobile phone, a tablet computer, a notebook computer, a palmtop computer, an on-board electronic device, a wearable device, an ultra-mobile personal computer (UMPC), a netbook, a personal digital assistant (PDA), etc., and the non-mobile electronic devices may be a server, a network attached storage (NAS), a personal computer (PC), a television (TV), a teller machine, a self-service machine, etc. No specific limitation is made thereto in the embodiments of this application.

The application program control apparatus in the embodiments of this application may be an apparatus having an operating system. The operating system may be an Android operating system, an ios operating system, or other possible operating systems, and is not specifically limited in the embodiments of this application.

The application program control apparatus provided in the embodiments of this application can implement each process implemented by the method embodiment in FIG. 1. To avoid repetition, details are not described here.

Figure 9:
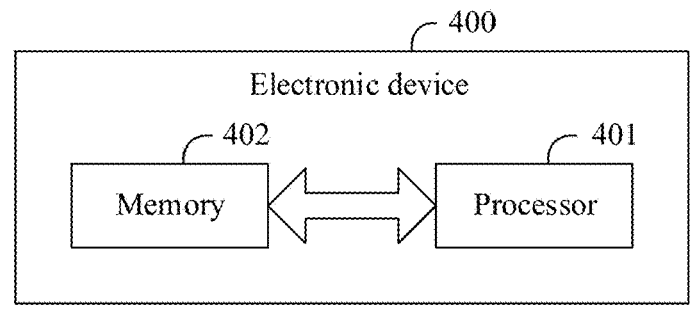
FIG. 9 is a first schematic structural diagram of an electronic device provided in the embodiments of this application.

Optionally, as shown in FIG. 9, the embodiments of this application further provide an electronic device 400, including a processor 401, a memory 402, and a program or an instruction stored on the memory 402 and capable of running on the processor 401, where the program or instruction, when executed by the processor 401, implements each process of the application program control method embodiments and can achieve the same technical effect. To avoid repetition, details are not described here.

It should be noted that the electronic device in the embodiments of this application include the aforementioned mobile electronic device and non-mobile electronic device.

Figure 10:
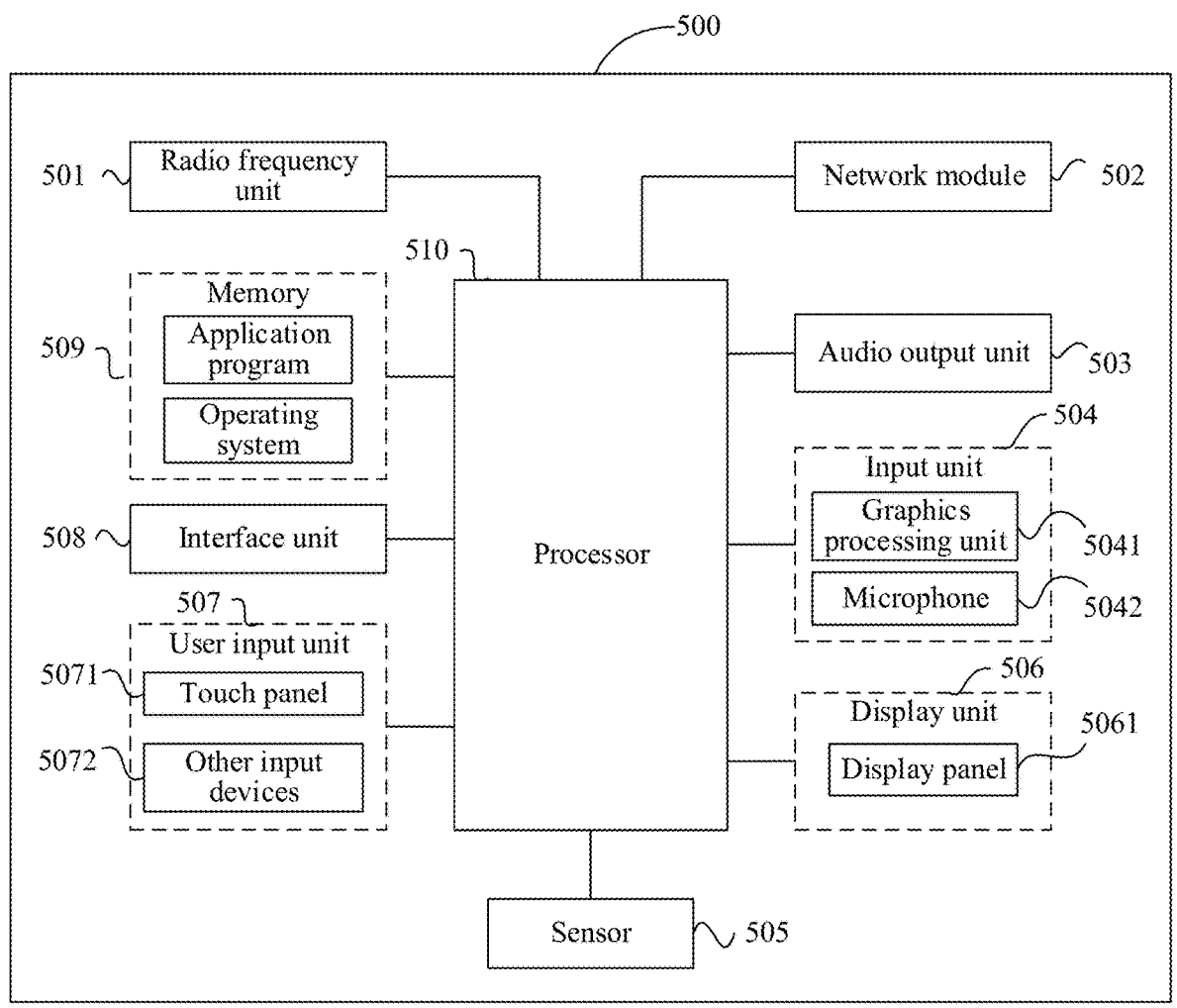
FIG. 10 is a second schematic structural diagram of an electronic device provided in the embodiments of this application.

FIG. 10 is a schematic hardware structural diagram of the electronic device according to the embodiments of this application.

The electronic device 500 includes, but is not limited to: a radio frequency unit 501, a network module 502, an audio output unit 503, an input unit 504, a sensor 505, a display unit 506, a user input unit 507, an interface unit 508, a memory 509, a processor 510, and other components.

Persons skilled in the art can understand that the electronic device 500 may further includes a power supply (e.g., a battery) supplying power to each component. The power supply may be logically connected to the processor 510 through a power management system, so as to achieve functions such as charging management, discharging management, and power consumption management through the power management system. The electronic device structure shown in FIG. 10 does not form a limitation to the electronic device, and the electronic device may include more or less components than those shown in the drawing, or combine some components, or employ different component arrangements. Details are not described here.

The processor 510 is configured to: in a case that a preset program running stop condition is satisfied, stop the running of a target application program.

The display unit 506 is configured to: display a first preset identifier at a first preset position of a target program icon, where the target program icon is an icon corresponding to the target application program, and the first preset identifier is used for indicating that the target application program is in a running stopped state.

Optionally, the display unit 506 is further configured to:

in a case that the target application program supports running some subtasks, display the first preset identifier at the first preset position of the target program icon, and display a second preset identifier at a second preset position of the target program icon, where the second preset identifier is used for indicating that the target application program supports running some subtasks.

Optionally, the user input unit 507 is configured to receive a first input performed by a user for the target application program; and the processor 510 is further configured to: in response to the first input, resume the running of the target application program, where the first input includes at least one of the following: an input for the target program icon, an input for the first preset identifier displayed at the first preset position of the target program icon, and an input for the second preset identifier displayed at the second preset position of the target program icon.

Optionally, the display unit 506 is further configured to: in a case that the target application program only supports running all subtasks, display first prompt information, where the first prompt information is used for confirming whether to resume the running the target application program; and the processor 510 is further configured to: in a case of receiving a second input performed by the user for the first prompt information, resume the running of the target application program.

Optionally, the display unit 506 is further configured to: in a case that the target application program supports running some subtasks, display task information of at least one subtask of the target application program;

the user input unit 507 is further configured to: receive a third input for task information of a target subtask among the at least one subtask; and the processor 510 is further configured to: in response to the third input, resume the running of the target subtask.

Optionally, the task information includes at least a task name, and the task information further includes at least one of the following: task priority, task type, and estimated task power consumption.

Optionally, the task information is displayed in a preset floating window, the preset floating window further includes at least one task control, and the task control is used for controlling each of the subtasks to stop running or resume running, where each subtask corresponds to a task control.

Optionally, the display unit 506 is further configured to: cancel the display of the first preset identifier; and display a third preset identifier at a third preset position of the target program icon, where the third preset identifier is used for indicating the power consumed in real time by the target application program after the running of the target subtask is resumed.

Optionally, the processor 510 is further configured to: in a case that the power consumed by the target application program is higher than a first preset threshold, stop the running of all subtasks of the target application program, and display the first preset identifier at the first preset position of the target program icon; and the display unit 506 is further configured to: display second prompt information, where the second prompt information is used for giving a prompt that all subtasks of the target application program have stopped running.

Optionally, the processor 510 is further configured to: in a case that the target application program supports running some subtasks and a preset first task running resumption condition is satisfied, resume the running of a first subtask of the target application program; and the processor 510 is further configured to: in a case that a preset second task running resumption condition is satisfied, resume the running of a second subtask of the target application program, where the target application program includes N subtasks, the N subtasks include the first subtask and the second subtask, and N is an integer greater than one.

Optionally, the processor 510 is further configured to: update the first preset identifier to a first display state, where the first display state indicates that the first subtask is in a resumed running state and all of the N subtasks other than the first subtask are in a running stopped state; and the processor 510 is further configured to: update the first preset identifier to a second display state, where the second display state indicates that the first subtask and the second subtask are in a resumed running state and all of the N subtasks other than the first subtask and the second subtask are in a running stopped state.

Optionally, the processor 510 is further configured to: in a case that the electronic device is connected to a charging device, resume the running of the target application program, and cancel the display of the first preset identifier.

Optionally, the program running stop condition includes at least one of the following:

an input performed by a user for confirming stopping of the running the target application program is received, and the total power of the electronic device is less than a second preset threshold.

Optionally, the first task running resumption condition includes at least one of the following:

an input performed by a user for the first subtask is received, and the total power of the electronic device is greater than a third preset threshold; and the second task running resumption condition includes at least one of the following:

an input performed by a user for the second subtask is received, and the total power of the electronic device is greater than a fourth preset threshold, where the fourth preset threshold is greater than the third preset threshold.

In the embodiments of this application, in a case that a preset program running stop condition is satisfied, the processor stops the running of a target application program; and the display unit displays a first preset identifier at a first preset position of a target program icon, where the target program icon is an icon corresponding to the target application program, and the first preset identifier is used for indicating that the target application program is in a running stopped state. In this way, an electronic device can stop the running of the target application program in a case that the power is low and there is no charging device so as to facilitate precise control of the power of the electronic device and prevent shut down of the electronic device, thereby increasing the convenience of using the electronic device; and by displaying the first preset identifier on an icon, a user is prompted by intuitive display that the application program corresponding to the icon has stopped running, such that the user can quickly obtain state information of the application program.

It should be noted that, in the embodiments of this application, an input unit 504 may include a graphics processing unit (Graphics Processing Unit, GPU) 5041 and a microphone 5042, the GPU 5041 processes image data of still pictures or videos obtained by an image capture device (e.g., a camera) in a video capture mode or an image capture mode. The display unit 506 may include a display panel 5061. The display panel 5061 may be configured in the form of a liquid crystal display, an organic light-emitting diode and so on. The user input unit 507 includes a touch panel 5071 and other input devices 5072. The touch panel 5071 is also referred to as a touch screen. The touch panel 5071 may include two parts: a touch detection device and a touch controller. The other input devices 5072 may include, but are not limited to, a physical keyboard, function keys (such as a volume control key and an on/off key), a trackball, a mouse, and an operating rod. Details are not described here. The memory 509 may be configured to store software programs and various data, including but is not limited to application programs and operating systems. The processor 510 may be integrated with an application processor and a modem processor, where the application processor mainly processes an operating system, user interfaces, application programs and so on, and the modem processor mainly processes wireless communication. It can be understood that the modem processor likewise may not be integrated into the processor 510.

The embodiments of this application further provide a readable storage medium. The readable storage medium has a program or an instruction stored thereon. The program or instruction, when executed by a processor, implements each process of the application program control method embodiments above and can achieve the same technical effect. To avoid repetition, details are not described here.

The processor is the processor in the electronic device described in the above embodiments. The readable storage medium includes a computer readable storage medium, such as a read-only memory (ROM), a random access memory (RAM), a floppy disk, and an optical disc.

The embodiments of this application further provide a chip. The chip includes a processor and a communication interface, where the communication interface is coupled to the processor, and the processor is configured to run a program or an instruction to implement each process of the application program control method embodiments above and can achieve the same technical effect. To avoid repetition, details are not described here.

It should be understood that the chip mentioned in the embodiments of this application may be referred to as a system-on-chip, a system on a chip, a system-on-a-chip, SoC or the like.

It can be understood that the embodiments described in this disclosure may be implemented by hardware, software, firmware, middleware, microcode, or a combination thereof. For the implementation by hardware, modules, units, sub-modules, subunits, etc. may be implemented by one or more application-specific integrated circuits (ASICs), digital signal processors (DSPs), digital signal processing devices DSPDs), programmable logic devices (PLDs), field-programmable gate arrays (FPGAs), general-purpose processors, controllers, microcontrollers, microprocessors, other electronic units for executing the functions of this application, or a combination thereof.

It is to be noted that, in the disclosure, the terms "include", "comprise" or any other variations thereof are intended to cover a non-exclusive inclusion, such that a process, method, article, or apparatus including a series of elements not only includes the described elements, but also includes other elements not clearly listed, or further includes elements inherent to the process, method, article, or apparatus. In the absence of more limitations, an element defined by the statement "including a/an . . . " does not exclude that the process, method, article, or apparatus including the element further has other identical elements. In addition, it should be noted that the scope of the method and apparatus in the embodiments of this application is not limited to performing functions in the order shown or discussed, and may also include performing the functions in a substantially simultaneous manner or in the reverse order depending on the functions involved, e.g., the method described may be performed in an order different from that described, and the steps may be added, omitted, or combined. In addition, features described with reference to some examples may be combined in other examples.

By means of the description of the foregoing implementations, a person skilled in the art can clearly know that the method according to the foregoing embodiments may be implemented by software and a necessary general-purpose hardware platform, and can also be implemented by the hardware, but in many cases, the former is a better implementation. Based on such an understanding, the technical solutions of this application or the part thereof contributing to the prior art may be essentially embodied in the form of a software product. The computer software product is stored in a storage medium (such as a ROM/RAM, a floppy disk, or an optical disc) and includes a plurality of instructions so that a terminal (which may be a mobile phone, a computer, a server, a conditioner, a network device, or the like) performs the method according to the embodiments of this application.

The embodiments of this application are described above with reference to the accompanying drawings, but this application is not limited to the foregoing detailed description. The foregoing detailed description is only schematic but not restrictive. Given the motivation of this application, a person of ordinary skill in the art may make many forms, without departing from the purpose of this application and the scope of protection of the claims, which all fall within the scope of protection of this application.

What is claimed is:

1. An application program control method, comprising:
   in a case that a preset program running stop condition is satisfied, stopping the running of a target application program; and
   displaying a first preset identifier at a first preset position of a target program icon, wherein the target program icon is an icon corresponding to the target application program, and the first preset identifier is used for indicating that the target application program is in a running stopped state,
   after the stopping of the running of the target application program, the method further comprises:
   receiving a first input performed by a user for the target application program; and
   in response to the first input, resuming the running of the target application program, wherein the first input comprises at least one of the following:
      an input for the target program icon, an input for the first preset identifier displayed at the first preset position of the target program icon, or an input for the second preset identifier displayed at the second preset position of the target program icon;
   the resuming of the running of the target application program comprises:
      in a case that the target application program supports running some subtasks, displaying task information of at least one subtask of the target application program;
      receiving a third input for task information of a target subtask among the at least one subtask; and
      in response to the third input, resuming the running of the target subtask.

2. The method according to claim 1, wherein the displaying a first preset identifier at a first preset position of the target program icon comprises:
   in a case that the target application program supports running some subtasks, displaying the first preset identifier at the first preset position of the target program icon, and displaying a second preset identifier at a second preset position of the target program icon, wherein the second preset identifier is used for indicating that the target application program supports running some subtasks.

3. The method according to claim 1, wherein the resuming of the running of the target application program comprises:
   in a case that the target application program only supports running all subtasks, displaying first prompt information, wherein the first prompt information is used for confirming whether to resume the running of the target application program; and in a case of receiving a second input performed by the user for the first prompt information, resuming the running of the target application program.

4. The method according to claim 1, wherein the task information comprises at least a task name, and the task information further comprises at least one of the following: task priority, task type, or estimated task power consumption.

5. The method according to claim 1, wherein the task information is displayed in a preset floating window, the preset floating window further comprises at least one task control, and the task control is used for controlling each of the subtasks to stop running or resume running, wherein each subtask corresponds to a task control.

6. The method according to claim 1, wherein after the resuming of the running of the target subtask, the method further comprises:

canceling the display of the first preset identifier; and displaying a third preset identifier at a third preset position of the target program icon, wherein the third preset identifier is used for indicating the power consumed in real time by the target application program after the running of the target subtask is resumed.

7. The method according to claim 6, wherein after the canceling of the display of the first preset identifier, the method further comprises:

in a case that the power consumed by the target application program is higher than a first preset threshold, stopping the running of all subtasks of the target application program, and displaying the first preset identifier at the first preset position of the target program icon; and displaying second prompt information, wherein the second prompt information is used for giving a prompt that all subtasks of the target application program have stopped running.

8. The method according to claim 1, wherein after the stopping of the running of the target application program, the method further comprises:

in a case that the target application program supports running some subtasks and a preset first task running resumption condition is satisfied, resuming the running of a first subtask of the target application program; and in a case that a preset second task running resumption condition is satisfied, resuming the running of a second subtask of the target application program, wherein the target application program comprises N subtasks, the N subtasks comprises the first subtask and the second subtask, and N is an integer greater than one.

9. The method according to claim 8, wherein after the resuming of the running of a first subtask of the target application program, the method further comprises:

updating the first preset identifier to a first display state, wherein the first display state indicates that the first subtask is in a resumed running state and all of the N subtasks other than the first subtask are in a running stopped state; and after the resuming of the running of a second subtask of the target application program, the method further comprises:

updating the first preset identifier to a second display state, wherein the second display state indicates that the first subtask and the second subtask are in a resumed running state and all of the N subtasks other than the first subtask and the second subtask are in a running stopped state.

10. The method according to claim 8, wherein the first task running resumption condition comprises at least one of the following:

an input performed by a user for the first subtask is received, or the total power of the electronic device is greater than a third preset threshold; and the second task running resumption condition comprises at least one of the following:

an input performed by a user for the second subtask is received, or the total power of the electronic device is greater than a fourth preset threshold, wherein the fourth preset threshold is greater than the third preset threshold.

11. The method according to claim 1, wherein after the stopping of the running of the target application program, the method further comprises:

in a case that an electronic device is connected to a charging device, resuming the running of the target application program, and canceling the display of the first preset identifier.

12. The method according to claim 1, wherein the first program running stop condition comprises at least one of the following:

an input performed by a user for confirming stopping of the running the target application program is received, or the total power of the electronic device is less than a second preset threshold.

13. An electronic device, comprising:

a processor; and memory storing a program or an instruction that is capable of running on the processor, wherein the program or instruction, when executed by the processor, causes the electronic device to perform the following steps:

in a case that a preset program running stop condition is satisfied, stopping the running of a target application program; and displaying a first preset identifier at a first preset position of a target program icon, wherein the target program icon is an icon corresponding to the target application program, and the first preset identifier is used for indicating that the target application program is in a running stopped states;

after stopping of the running of the target application program, the program or instruction, when executed by the processor, causes the electronic device to further perform the following steps:

receiving a first input performed by a user for the target application program; and in response to the first input, resuming the running of the target application program, wherein the first input comprises at least one of the following:

an input for the target program icon, an input for the first preset identifier displayed at the first preset position of the target program icon, or an input for the second preset identifier displayed at the second preset position of the target program icon;

the program or instruction, when executed by the processor, causes the electronic device to further perform the following steps:

in a case that the target application program supports running some subtasks, displaying task information of at least one subtask of the target application program;

receiving a third input for task information of a target subtask among the at least one subtask; and in response to the third input, resuming the running of the target subtask.

14. The electronic device according to claim 13, wherein in the process of displaying a first preset identifier at a first preset position of a target program icon by the electronic device, the program or instruction, when executed by the processor, causes the electronic device to further perform the following steps:

in a case that the target application program supports running some subtasks, displaying the first preset identifier at the first preset position of the target program icon, and displaying a second preset identifier at a second preset position of the target program icon, wherein the second preset identifier is used for indicating that the target application program supports running some subtasks.

15. The electronic device according to claim 13, wherein after the stopping of the running of the target application program, the program or instruction, when executed by the processor, causes the electronic device to further perform the following steps:

in a case that the target application program supports running some subtasks and a preset first task running resumption condition is satisfied, resuming the running of a first subtask of the target application program; and in a case that a preset second task running resumption condition is satisfied, resuming the running of a second subtask of the target application program, wherein the target application program comprises N subtasks, the N subtasks comprises the first subtask and the second subtask, and N is an integer greater than one.

16. The electronic device according to claim 15, wherein after the resuming of the running of a first subtask of the target application program, the program or instruction, when executed by the processor, causes the electronic device to further perform the following steps:

updating the first preset identifier to a first display state, wherein the first display state indicates that the first subtask is in a resumed running state and all of the N subtasks other than the first subtask are in a running stopped state; and after the resuming of the running of a second subtask of the target application program, the method further comprises:

updating the first preset identifier to a second display state, wherein the second display state indicates that the first subtask and the second subtask are in a resumed running state and all of the N subtasks other than the first subtask and the second subtask are in a running stopped state.

17. The electronic device according to claim 15, wherein the first task running resumption condition comprises at least one of the following:

an input performed by a user for the first subtask is received, or the total power of the electronic device is greater than a third preset threshold; and the second task running resumption condition comprises at least one of the following:

an input performed by a user for the second subtask is received, or the total power of the electronic device is greater than a fourth preset threshold, wherein the fourth preset threshold is greater than the third preset threshold.

18. The electronic device according to claim 13, wherein after the stopping of the running of the target application program, the program or instruction, when executed by the processor, causes the electronic device to further perform the following steps:

in a case that an electronic device is connected to a charging device, resuming the running of the target application program, and canceling the display of the first preset identifier.

19. The electronic device according to claim 13, wherein the first program running stop condition comprises at least one of the following:

an input performed by a user for confirming stopping of the running the target application program is received, or the total power of the electronic device is less than a second preset threshold.

* * * * *